United States Patent
Shin et al.

(10) Patent No.: US 12,390,751 B2
(45) Date of Patent: Aug. 19, 2025

(54) NONWOVEN FABRIC FOR CABIN AIR FILTER COMPRISING LOW MELTING POINT POLYESTER FIBER

(71) Applicant: HUVIS CORPORATION, Seoul (KR)

(72) Inventors: Hyun Wook Shin, Daejeon (KR); Min Sung Lee, Daejeon (KR); Jae Min Choi, Daejeon (KR); Sung Yeol Kim, Sejong-si (KR)

(73) Assignee: HUVIS CORPORATION, Seoul (KR)

( * ) Notice: Subject to any disclaimer, the term of this patent is extended or adjusted under 35 U.S.C. 154(b) by 595 days.

(21) Appl. No.: 17/034,381

(22) Filed: Sep. 28, 2020

(65) Prior Publication Data

US 2021/0113947 A1   Apr. 22, 2021

(30) Foreign Application Priority Data

Oct. 16, 2019  (KR) .................. 10-2019-0128562

(51) Int. Cl.
*B01D 39/00* (2006.01)
*B01D 39/16* (2006.01)

(52) U.S. Cl.
CPC .. *B01D 39/1623* (2013.01); *B01D 2239/0618* (2013.01); *B01D 2239/10* (2013.01); *B01D 2325/04* (2013.01); *B01D 2325/32* (2013.01)

(58) Field of Classification Search
CPC ............ B01D 39/1623; B01D 2325/04; B01D 2325/32; B01D 2239/0618; B01D 2239/10
USPC ............................................. 55/527
See application file for complete search history.

(56) References Cited

U.S. PATENT DOCUMENTS

| | | | |
|---|---|---|---|
| 3,998,988 A * | 12/1976 | Shimomai | A24D 3/08 428/374 |
| 5,069,970 A * | 12/1991 | Largman | D01F 6/92 428/397 |
| 5,380,816 A * | 1/1995 | Sullivan | C08G 63/18 427/385.5 |
| 2003/0170453 A1 * | 9/2003 | Foss | A41B 17/00 428/375 |
| 2008/0227355 A1 * | 9/2008 | Chakravarty | D04H 1/5418 525/418 |
| 2010/0237528 A1 * | 9/2010 | Derrien | B29C 49/46 425/1 |
| 2011/0232653 A1 * | 9/2011 | Imashiro | B01D 39/2072 977/700 |
| 2013/0337249 A1 * | 12/2013 | Fenyvesi | H01B 3/50 442/364 |
| 2017/0369674 A1 * | 12/2017 | Matteucci | C08K 3/346 |
| 2018/0028953 A1 * | 2/2018 | Tanaka | B01D 46/10 |
| 2019/0256734 A1 * | 8/2019 | Maslow | C08G 8/12 |
| 2021/0061193 A1 * | 3/2021 | Shin | B60R 13/0846 |
| 2022/0041801 A1 * | 2/2022 | Shin | C08G 63/16 |

FOREIGN PATENT DOCUMENTS

| | | | | |
|---|---|---|---|---|
| KR | 1020050090087 | | 3/2007 | |
| WO | WO-2018021615 A1 * | | 2/2018 | ............ B32B 5/022 |

OTHER PUBLICATIONS

Adhesive and Sealing Materials, Edited by Deng Shunyang, China Petrochemical Press.
Green Composite Materials, Edited by Jianmao Tang, China Railway Station Publishig House.

* cited by examiner

*Primary Examiner* — T. Bennett Mckenzie
(74) *Attorney, Agent, or Firm* — Hauptman Ham, LLP

(57) ABSTRACT

The present invention relates to a nonwoven fabric for cabin air filter including a low melting point polyester fiber, in which the nonwoven fabric for cabin air filter includes a first polyester fiber containing a polyester resin having a melting point higher than 250° C. and a second polyester fiber containing a low melting point polyester resin having a softening point of 100 to 150° C., the first polyester fiber is a modified cross-sectional yarn having a roundness of 50 to 80%, the second polyester fiber includes a low melting point polyester resin which is formed from an acid component included of terephthalic acid or ester-forming derivatives thereof, and a diol component included of 2-methyl-1,3-propanediol, 2-methyl-1,3-pentanediol, and ethylene glycol, and the second polyester fiber contains illite particles, i.e., micaceous mineral, or a mixture of the illite particles and sericite particles, and silver-based inorganic antibacterial agent particles.

3 Claims, No Drawings

NONWOVEN FABRIC FOR CABIN AIR FILTER COMPRISING LOW MELTING POINT POLYESTER FIBER

CROSS-REFERENCE TO RELATED APPLICATION

This application claims the benefit of Korean Application No. 10-2019-0128562 filed on Oct. 16, 2019 with the Korean Intellectual Property Office, the disclosure of which is incorporated herein by reference.

BACKGROUND OF THE INVENTION

1. Field of the Invention

The present invention relates to a nonwoven fabric for cabin air filter including a low melting point polyester fiber and, more specifically, to a nonwoven fabric for cabin air filter including a low melting point polyester fiber which is excellent in filtration efficiency and has improved antibacterial properties by using fibers including a novel low melting point polyester resin.

2. Description of the Related Art

A cabin air filter has been used in an automobile to purify indoor air, and the cabin air filter has functions of removing dust inside the automobile and removing harmful gases such as volatile organic compounds due to demands in the consumer health and indoor comfort.

Methods for inhibiting harmful bacteria and harmful gases by using a conventional existing cabin air filter include a method of adhering a chemical antibacterial agent, or deodorizing powders including activated carbon, zeolite and titanium dioxide photocatalyst to a nonwoven fabric having a filtration function by using a binder, and other methods.

Namely, after preparing a binder polymer solution by dispersing the chemical antibacterial agent or deodorizing powders through various coating methods including a spray method, a roll coating method, a dip coating method, and others, and applying the polymer solution to at least one surface of the nonwoven fabric, the polymer solution applied to the at least one surface of the nonwoven fabric is dried such that the antibacterial agent or deodorizing powders is or are fixated to the nonwoven fabric by a binder polymer. However, the binder polymer solution causes problems of clogging the pores by permeating into pores of the deodorizing powders, causing secondary pollution, causing a problem of the toxicity of the antibacterial agent itself, etc., or deteriorating deodorization performance of the deodorizing powders by allowing the bacteria or viruses to grow within the antibacterial agent itself after collecting bacteria or viruses.

The reason that the binder polymer should be used despite these problems is to prevent the antibacterial agent or deodorizing powders from being separated from the nonwoven fabric. Therefore, a method of preventing secondary contamination caused by the growth of the bacteria and viruses due to use of general chemical antibacterial agents, and methods capable of removing toxicity and minimizing deterioration in virus adsorption and removal performance of the deodorizing powders by excluding use of the binder polymer are needed.

A method of manufacturing a complex filter which is manufactured such that deodorizing powder is not separated through a bottom surface of the web by preparing a web included of monofilaments having a high melting fiber and a low melting fiber bonded thereto, and applying heat to one surface of a web, thereby melting the low melting fiber is disclosed in Korean Patent Laid-Open Publication No. 2007-0035344. However, there have been a disadvantage that the deodorizing powder flows inside the web depending on an external environment such as vibration so that the deodorizing powder is aggregated onto the bottom surface of the web as the deodorizing powder is not fixated, and a problem of polluting indoor air as antibacterial properties are deteriorated such that bacteria propagate in the filter in the complex filter manufactured according to these techniques.

A cabin air filter using a high efficiency particulate air (HEPA) filter and other filters has recently been used, an antibacterial function and other functions are additionally added to the cabin air filter, and existing antibacterial agents and methods used in such a filter have had little or low sterilization effects on some bacteria, and have been causing secondary pollution and chemical toxicity, thereby causing problems that are rather harmful to the human body.

SUMMARY OF THE INVENTION

The present invention has been invented to solve the aforementioned problems of existing techniques, and an object of the present invention is to provide a nonwoven fabric for cabin air filter including a low melting point polyester fiber having excellent dust capture power and excellent antibacterial properties by using a low melting point polyester fiber which has improved thermal adhesive properties, is excellent in physical properties such as strength, and has improved antibacterial properties.

Further, another object of the present invention is to provide a nonwoven fabric for cabin air filter including a low melting point polyester fiber according to the present invention, the nonwoven fabric for cabin air filter including a low melting point polyester fiber having excellent processability which maintains high strength even at high temperatures by having high adhesive properties even at high temperatures.

The present invention provides a nonwoven fabric for cabin air filter including a low melting point polyester fiber, in which the nonwoven fabric for cabin air filter includes a first polyester fiber containing a polyester resin having a melting point higher than 250° C. and a second polyester fiber containing a low melting point polyester resin having a softening point of 100 to 150° C., the first polyester fiber is a modified cross-sectional yarn having a roundness of 50 to 80%, the second polyester fiber includes a low melting point polyester resin which is formed from an acid component included of terephthalic acid or ester-forming derivatives thereof, and a diol component included of 2-methyl-1,3-propanediol, 2-methyl-1,3-pentanediol, and ethylene glycol, and the second polyester fiber contains illite particles, i.e., micaceous mineral, or a mixture of the illite particles and sericite particles, and silver-based inorganic antibacterial agent particles.

Furthermore, the present invention provides a nonwoven fabric for cabin air filter including a low melting point polyester fiber, in which the second polyester fiber contains 0.3 to 10 wt % of the illite particles, i.e., micaceous mineral, or the mixture of the illite particles and sericite particles with respect to weight of the second polyester fiber, and the second polyester fiber contains 5 to 30 wt % of the silver-based inorganic antibacterial agent particles with respect to weight of the micaceous mineral.

Furthermore, the present invention provides a nonwoven fabric for cabin air filter including a low melting point polyester fiber, in which the second polyester fiber is a modified cross-sectional yarn having a roundness of 50 to 80%.

Furthermore, the present invention provides a nonwoven fabric for cabin air filter including a low melting point polyester fiber, in which the low melting point polyester resin contains 0.01 to 5 mol % of 2-methyl-1,3-pentanediol in the diol component.

Furthermore, the present invention provides a nonwoven fabric for cabin air filter including a low melting point polyester fiber, in which the second polyester fiber is a polyester composite fiber which is formed of a sheath part and a core part, the core part is formed from a general polyester resin, and the sheath part is formed from a low melting point polyester resin.

Furthermore, the present invention provides a nonwoven fabric for cabin air filter including a low melting point polyester fiber, in which the low melting point polyester resin has 600 poises or less of a melt viscosity difference between a melt viscosity at 220° C. and a melt viscosity at 260° C.

As described above, a nonwoven fabric for cabin air filter including a low melting point polyester fiber according to the present invention has effects of having excellent dust capture power and excellent antibacterial properties by using a low melting point polyester fiber which has improved thermal adhesive properties, is excellent in physical properties, and has improved antibacterial properties.

Further, a nonwoven fabric for cabin air filter including a low melting point polyester fiber according to the present invention has an excellent processability effect of maintaining high strength even at high temperatures by having high adhesive properties even at high temperatures.

DETAILED DESCRIPTION OF THE PREFERRED EMBODIMENT

Hereinafter, a preferred embodiment of the present invention will be described in detail. First, in explaining the present invention, specific description of related announcement functions or configurations are omitted to ensure that the gist of the present invention is not obscured.

Terms of degree used in the present specification, 'about', 'substantially' and others are used at numerical values thereof or as a meaning close to the numerical values when unique manufacturing and material tolerances are suggested to mentioned meanings, and are used so as to prevent unconscientious infringers from unfairly using disclosed contents with correct or absolute numerical values being mentioned therein to help you understand the present invention.

The present invention relates to a nonwoven fabric for cabin air filter including a low melting point polyester fiber including a first polyester fiber containing a polyester resin having a melting point higher than 250° C. and a second polyester fiber containing a low melting point polyester resin having a softening point of 100 to 150° C.

The first polyester fiber may be polyethylene terephthalate (PET) which is formed from terephthalic acid or ester-forming derivatives thereof and ethylene glycol (EG), and may be copolyester resin in which functional compounds are copolymerized for the purpose of functionality.

The polyester resin having a melting point higher than 250° C. may include any polyester resins having a high melting point.

Further, the first polyester fiber is a modified cross-sectional yarn having a roundness of 50 to 80%.

Although the first polyester fiber may include any modified cross-sectional yarns having a roundness of 50 to 80%, the first polyester fiber may include a modified cross-sectional yarn having multiple leaves with preferably a cross-section of 3 to 8 leaves, the most preferably a cruciform cross-section of 4 leaves or a stellate cross-section of 5 or 6 leaves for the purposes of capturing properties and manufacturing process properties.

The second polyester fiber is a fiber including a low melting point polyester resin which is formed from an acid component included of terephthalic acid or ester-forming derivatives thereof, and a diol component included of 2-methyl-1,3-propanediol, 2-methyl-1,3-pentanediol, and ethylene glycol (EG).

The second polyester fiber may be a sheath-core type composite fiber which is formed by spinning the low melting point polyester resin alone, or in which a core part is formed of a general polyester resin, and a sheath part is formed of the low melting point polyester resin so as to improve physical properties of the second polyester fiber.

Although the general polyester resin forming the core part includes any resins when the second polyester fiber is a sheath-core type composite fiber, the general polyester resin preferably includes a polyethylene terephthalate (PET) resin produced from terephthalic acid and ethylene glycol, and the sheath part may be formed of the low melting point polyester resin.

As a methyl group is coupled to a second carbon of 2-methyl-1,3-propanediol, the 2-methyl-1,3-propanediol in a low melting point polyester resin used in the present invention facilitates rotation of a polymer main chain, and acts as if it is an end portion of a polymer, thereby increasing flow possibility of the entire molecular chain by expanding a free space between main chains. Accordingly, the 2-methyl-1,3-propanediol causes the polymer to be atypical and to have the same thermal properties as isophthalic acid. The 2-methyl-1,3-propanediol plays a role of improving tear properties during binding of nonwoven fabric by improving elasticity caused by flexible molecular chains existing in a polymer main chain.

Namely, the 2-methyl-1,3-propanediol may adjust softening point ($T_s$) and/or glass transition temperature ($T_g$) by including a methyl group ($—CH_3$) as a side chain in an ethylene chain coupled to terephthalate to secure a space such that a main chain of a polymerized resin may be rotated, thereby inducing an increase in the degree of freedom of the main chain and a drop in crystallinity of the resin. The 2-methyl-1,3-propanediol may exhibit the same effect as in a case of using isophthalic acid (IPA) containing asymmetric aromatic rings to lower crystallinity of a conventional crystalline polyester resin.

As a methyl group is coupled to a second carbon in the 2-methyl-1,3-pentanedial as in the 2-methyl-1,3-propanediol, the 2-methyl-1,3-pentanediol facilitates rotation of the polymer main chain, has characteristics of giving low melting point properties to the polyester resin, and prevents melt viscosity from being rapidly lowered at high temperatures while increasing melt viscosity of the polyester resin with a molecular chain longer than the 2-methyl-1,3-propanediol.

In order to improve low melting point properties and adhesive force of a low melting point polyester resin according to the present invention formed from the aforementioned diol component, it is preferable that 20 to 50 mol % of the 2-methyl-1,3-propanediol of the low melting point polyester resin is contained in the diol component.

An effect of improving melt viscosity is insignificant when less than 0.01 mol % of the 2-methyl-1,3-pentanediol is contained in the diol component, and spinning process properties may be deteriorated as melt viscosity is rapidly increased when more than 5 mol % of the 2-methyl-1,3-pentanediol is contained in the diol component. Therefore, it is preferable that 0.01 to 5 mol % of the 2-methyl-1,3-pentanediol is contained in the dial component.

It is the most preferable that 0.05 to 2 mol % of the 2-methyl-1,3-pentanediol is contained in the diol component.

The low melting point polyester resin containing the 2-methyl-1,3-pentanedial has characteristics that melt viscosity is not rapidly lowered at high temperatures by having 600 poises or less of a melt viscosity difference between a melt viscosity at 220° C. and a melt viscosity at 260° C.

The lower a melt viscosity difference between the melt viscosity at 220° C. and the melt viscosity at 260° C. of the low melting point polyester resin is, the more preferable it is, and it will be more preferable that the melt viscosity difference between the melt viscosity at 220° C. and the melt viscosity at 260° C. of the low melting point polyester resin is 500 poises or less.

It will be preferable that a general polyester resin of the core part has a melt viscosity at 280° C. of 2,000 to 4,000 poises, and a polyester resin of the sheath part has a melt viscosity at 260° C. of 500 to 1,400 poises considering spinning properties of the composite fiber in a spinning process when forming the second polyester fiber of a sheath-core type composite fiber included of the low melting point polyester resin as the sheath part.

A cutting phenomenon may occur as spinning process properties are deteriorated when the melt viscosity of the general polyester resin of the core part is too high, and shape stability of the composite fiber may be deteriorated when the melt viscosity of the core part is lower than that of the polyester resin of the sheath part. That is, as a sheath-core type fiber cross-section may not be formed, it is preferable that the general polyester resin of the core part has a melt viscosity at 280° C. of 2,000 to 4,000 poises.

As the melt viscosity of the low melting point polyester resin of the sheath part is too high, shape stability of the composite fiber may be deteriorated and, when the melt viscosity of the sheath part is too low, cross-sectional nonuniformity, bending phenomenon, cutting phenomenon and other phenomena may occur, the polyester resin of the sheath part preferably has a melt viscosity at 260° C. of 600 to 1,500 poises, more preferably 600 poises or more.

As it is advantageous in improving shape stability and spinning process properties of the composite fiber that there is a certain difference range between melt viscosity of the general polyester resin forming the core part and melt viscosity of the polyester resin forming the sheath part, a melt viscosity difference between a melt viscosity at 280° C. of the general polyester resin forming the core part and a melt viscosity at 260° C. of the polyester resin forming the sheath part is preferably 700 to 2,500 poises, more preferably 1,000 to 2,000 poises.

A low melting point polyester resin according to the present invention containing 2-methyl-1,3-propanediol and 2-methyl-1,3-pentanediol as described above has excellent physical properties including a softening point of 100 to 150° C., a glass transition temperature of 50 to 90° C., and an intrinsic viscosity of 0.50 dl/g or more.

Further, as the second polyester fiber contains illite particles, i.e., micaceous mineral, or a mixture of the illite particles and sericite particles, and silver-based inorganic antibacterial agent particles, antibacterial properties of the second polyester fiber may be improved.

Examples of the micaceous mineral include illite, sericite, phlogopite, muscovite, and biotite, and the illite or sericite, as a mica group natural mineral which is excellent in functions of far-infrared radiation properties, antibacterial properties, heat storage properties, deodorizing properties and others, includes 45 to 80% of silica ($SiO_2$), 20 to 40% of alumina ($Al_2O_3$), 5 to 15% of potassium oxide ($K_2O$) and 0.7 to 4% of ferric oxide ($Fe_2O_3$) as main components, and has a hardness of 1 to 2 and a specific gravity of 2.6 to 2.9.

It will be preferable to use the illite particles, i.e., micaceous mineral, or the mixture of the illite particles and sericite particles in the present invention.

It will be preferable to use micaceous mineral and a silver-based inorganic antibacterial agent at the same time to maximize antibacterial properties of the second polyester fiber.

It is preferable that 0.3 to 10 wt % of the illite particles, i.e., micaceous mineral, or the mixture of the illite particles and sericite particles is contained with respect to weight of the second polyester fiber, and it is suitable for functional expression of the present invention that 5 to 30 wt % of the silver-based inorganic antibacterial agent particles is contained with respect to weight of the micaceous mineral.

Further, it will be preferable to adjust particle sizes of the micaceous mineral and silver-based inorganic antibacterial agent to 1 µm or less in order to apply the micaceous mineral and silver-based inorganic antibacterial agent to a polyester fiber in the present invention.

The micaceous mineral and silver-based inorganic antibacterial agent may be contained in the second polyester fiber during manufacturing of a second polyester fiber or may be contained in the low melting point polyester resin during synthesis of a low melting point polyester resin.

Alternatively, the second polyester fiber may be contained in each of a sheath part and a core part of the sheath-core type composite fiber when manufacturing the second polyester fiber into a sheath-core type composite fiber as described above.

Further, the second polyester fiber also may further improve dust capturing properties of a nonwoven fabric for cabin air filter by using a modified cross-sectional yarn having a roundness of 50 to 80%.

Although the second polyester fiber may include any modified cross-sectional yarns having a roundness of 50 to 80%, the second polyester fiber may include a modified cross-sectional yarn having multiple leaves with preferably a cross-section of 3 to 8 leaves as in the first polyester fiber, more preferably a cruciform cross-section of 4 leaves or a stellate cross-section of 5 or 6 leaves for the purposes of capturing properties and manufacturing process properties.

It will be preferable that the nonwoven fabric is formed of the first polyester fiber and second polyester fiber as monofilaments in a nonwoven fabric for cabin air filter including a low melting point polyester fiber according to the present invention as described above such that the first polyester fiber and second polyester fiber have a fineness of 0.5 to 6 deniers and a fiber length of 1 to 100 mm.

Further, it will be preferable that the first polyester fiber and second polyester fiber are mixed at a weight ratio of 20:80 to 80:20.

A nonwoven fabric for cabin air filter including a low melting point polyester fiber according to the present invention will make it possible to form a partial fusion between the fibers and form the partial fusion in a predetermined form by forming a fibrous layer in which the first polyester fiber and second polyester fiber are uniformly mixed, and thermally forming the fibrous layer at 100 to 200° C.

In a nonwoven fabric for cabin air filter according to the present invention including a first polyester fiber having a modified cross-section and a second polyester fiber having thermal bonding properties as described above, capture efficiency is improved as surface area inside the nonwoven fabric is increased by the modified cross-sectional fiber, and high antibacterial properties are obtained by the micaceous mineral and silver-based inorganic antibacterial agent contained in the second polyester fiber.

Hereinafter, Examples of a method for manufacturing a nonwoven fabric for cabin air filter including a low melting point polyester fiber according to the present invention are shown. However, the present invention is not limited to the Examples.

◆ Manufacturing Second Polyester Fibers

Manufacturing Examples 1 to 6

Process property-improved polyester fibers for binder according to the present invention were manufactured through a general conjugate spinning process by using polyethylene terephthalate having a melt viscosity at 280° C. of about 2,300 poises as a core part and a low melting point polyester resin as a sheath part at a weight ratio of the sheath part to the core part of 50:50.

A polyethylene terephthalate (PET) oligomer with a reaction rate of about 96% was manufactured by injecting terephthalate acid (TPA) and ethylene glycol (EG) into the low melting point polyester resin in an ester reaction tank and performing a usual polymerization reaction process in the ester reaction tank at 258° C. A transesterification process was performed at 250±2° C. by containing about 42 mol % of 2-methyl-1,3-propanediol in a diol component of the manufactured polyethylene terephthalate (PET), mixing 2-methyl-1,3-pentanediol at a content ratio shown in the following Table 1, and adding a transesterification catalyst to obtain a reaction mixture. Thereafter, second polyester fibers were manufactured by adding a condensation polymerization catalyst to the obtained reaction mixture, and performing a condensation polymerization reaction process while adjusting the final temperature and pressure within the reaction tank such that final temperature and pressure within the reaction tank become 280±2° C. and 0.1 mmHg, respectively.

Manufacturing Comparative Example 1

A second polyester fiber was manufactured by using polyethylene terephthalate as a core part in the same manner as in the Manufacturing Example 1, and using 66.5 mol % of terephthalic acid and 33.5 mol % of isophthalic acid as an acid component and using 10.5 mol % of diethylene glycol and 89.5 mol % of ethylene glycol as the diol component in the low melting point polyester resin of the sheath part.

Manufacturing Comparative Example 2

A second polyester fiber was manufactured by using polyethylene terephthalate as the core part in the same manner as in the Manufacturing Example 1, and using terephthalic acid as the acid component and using 42.5 mol % of 2-methyl-1,3-propanediol and 57.5 mol % of ethylene glycol as the diol component in the low melting point polyester resin of the sheath part.

TABLE 1

| Classification | Softening point (° C.) | $T_g$ (° C.) | IV (dl/g) | 2-methyl-1,3-pentanediol (mol %) | Melt viscosity | | |
|---|---|---|---|---|---|---|---|
| | | | | | 220° C. | 240° C. | 260° C. |
| Manufacturing Example 1 | 122 | 60.9 | 0.561 | 0.1 | 1254 | 1019 | 783 |
| Manufacturing Example 2 | 119 | 61.8 | 0.562 | 0.5 | 1314 | 1078 | 864 |
| Manufacturing Example 3 | 120 | 61.9 | 0.562 | 1.0 | 1528 | 1387 | 1196 |
| Manufacturing Example 4 | 123 | 63.5 | 0.562 | 2.0 | 2271 | 1739 | 1444 |
| Manufacturing Example 5 | 123 | 64.8 | 0.563 | 3.5 | 2833 | 2571 | 2213 |
| Manufacturing Example 6 | 126 | 67.3 | 0.561 | 5.0 | 3341 | 3041 | 2733 |
| Manufacturing Comparative Example 1 | 113 | 56.8 | 0.563 | 0 | 1011 | 739 | 467 |
| Manufacturing Comparative Example 2 | 121 | 61.5 | 0.561 | 0 | 1197 | 992 | 664 |

As shown in Table 1, it can be seen that the higher the content of 2-methyl-1,3-pentanediol is, the higher the melt viscosity is increased, and it can be seen that Manufacturing Examples 1 to 6 maintain high melt viscosities at high temperatures as all of melt viscosities at 260° C. in Manufacturing Examples 1 to 6 are 700 poises or more. Further, it can be seen that melt viscosity differences of 300 to 500 poises between melt viscosities at 220° C. and melt viscosities at 260° C. in Manufacturing Examples 2 to 4 in which 0.5 to 2 mol % of 2-methyl-1,3-pentanediol is contained in a diol component are lower than melt viscosity differences of 684 and 674 poises between melt viscosities at 220° C. and melt viscosity at 260° C. in Manufacturing Comparative Examples 1 and 2.

Further, it can be seen that the melt viscosities are rapidly increased as melt viscosities at 260° C. are 2,000 poises or more when 3 mol % or more of 2-methyl-1,3-pentanediol is contained in the diol component as in Manufacturing Examples 5 and 6.

► Measuring physical properties of fibers of Manufacturing Examples and Manufacturing Comparative Examples After measuring low melting point polyester resins and polyester fibers for binder manufactured in the aforementioned Manufacturing Examples and Manufacturing Comparative Examples as below, measurement results are shown in Tables 1 and 2.

(1) Measuring Softening Points (or Melting Points) and Glass Transition Temperatures ($T_g$)

Glass transition temperatures ($T_g$) of copolyester resins by using a differential scanning calorimetry (DSC-7, Perkin Elmer), and softening behaviors in thermomechanical analysis (TMA) modes were measured by using a dynamic machine analyzer (DMA-7, Perkin Elmer).

(2) Measuring Intrinsic Viscosities (IV)

After dissolving each of the polyester resins to a concentration of 0.5 wt % in a solution obtained by mixing phenol with tetrachloroethane at a weight ratio of 1:1, intrinsic viscosities (I.V) at 35° C. of the polyester resins dissolved in the mixed solution were measured by using Ubbelohde viscometer.

(3) Measuring Melt Viscosities

After melting the polyester resins to a measurement temperature, melt viscosities of the melted polyester resins were measured by using RDA-III of Rheometric Scientific Inc. Specifically, values at 100 rad/s were calculated into melt viscosities when performing a measurement process by setting from initial frequency=1.0 rad/s to final frequency=500.0 rad/s under frequency sweep conditions at a set temperature.

(4) Measuring Compressive Hardness Values

After opening 5 g of polyester fibers and piling up the opened polyester fibers to a height of 5 cm on a circular molding frame with a diameter of 10 cm, cylindrical-shaped molded articles were manufactured by thermal bonding the opened polyester fibers piled up on the molding frame at a set temperature for 90 seconds. Compressive hardness values were measured by compressing the manufactured molded articles to 75% through Instron and measuring loads applied to the compression. In the present experiment, compressive hardness values were measured by performing the thermal bonding process at thermal bonding temperatures of 140° C., 150° C. and 160° C., respectively.

(5) Measuring Spinning Yields (%, 24 Hrs)

Spinning yields were calculated by the following formula after measuring amounts of polyester resins used for 24 hours and amounts of spun fibers.

Spinning yield (%) (amount (kg) of spun fiber)/ amount (kg) of used PET resin)×100

(6) Measuring Room Temperature and High-Temperature Adhesive Properties

After preparing nonwoven fabrics of which densities are fixed to 2 g/100 cm² by thermally bonding polyester fibers of Examples and Comparative Examples, adhesive forces of the prepared nonwoven fabrics at 25±0.5° C. (room temperature) and 100±0.5° C. (high temperature) were measured in accordance with ASTM 01424.

(7) High Temperature Shrinking Properties

After manufacturing polyester fibers for binder into monofilaments, cylindrical polyester fibers were manufactured by carding the monofilaments. After applying heat of 170° C. to the cylindrical polyester fibers for 3 minutes, reduced volumes of the polyester fibers were measured. As volume of an existing polyester fiber is 330 cm², it can be evaluated that the more volume of the polyester fiber is decreased, the worse shape stability of the polyester fiber is. It can be evaluated that shape stability of the polyester fiber is a falling level when volume of the existing polyester fiber is generally 250 cm² or less, and shape stability of the polyester fiber is excellent when volume of the existing polyester fiber is 280 cm³ or more.

TABLE 2

| Classification | Compressive hardness (kgf) | | | Spinning yield (%, 24 hr) | Adhesive force | | Shape stability High temperature shrinking properties [cm³] |
| --- | --- | --- | --- | --- | --- | --- | --- |
| | 140° C. | 150° C. | 160° C. | | Room-temperature adhesive force [kgf] | High-temperature adhesive force [kgf] | |
| Manufacturing Example 1 | 0.55 | 0.72 | 0.98 | 98.5 | 56.2 | 4.1 | 268 |
| Manufacturing Example 2 | 0.57 | 0.79 | 1.07 | 99.2 | 57.4 | 4.3 | 271 |
| Manufacturing Example 3 | 0.62 | 0.88 | 1.21 | 99.3 | 57.3 | 4.7 | 275 |
| Manufacturing Example 4 | 0.61 | 1.24 | 1.36 | 99.5 | 58.1 | 4.9 | 281 |
| Manufacturing Example 5 | 0.73 | 1.39 | 1.55 | 95.6 | 58.3 | 5.1 | 274 |
| Manufacturing Example 6 | 0.76 | 1.54 | 1.86 | 91.3 | 57.2 | 5.2 | 271 |
| Manufacturing Comparative Example 1 | 0.41 | 0.57 | 0.74 | 97.8 | 55.3 | 3.2 | 254 |
| Manufacturing Comparative Example 2 | 0.52 | 0.73 | 0.91 | 98.1 | 55.7 | 3.9 | 260 |

The higher the numerical value of compressive hardness, the better thermal adhesive properties between fibers of a molded article. As shown in the aforementioned Table 2, it can be seen that Manufacturing Examples 1 to 6, i.e., a low melting point polyester fiber according to the present invention have excellent thermal adhesive properties by having high compressive hardness values compared to Manufacturing Comparative Examples 1 and 2, and it can be seen that Manufacturing Examples 1 to 6 of the present invention have excellent adhesive forces compared to Manufacturing Comparative Examples 1 and 2 although measured room-temperature adhesive forces of low melting point polyester resins of Examples 1 to 6 and Comparative Examples are all tuned out to be excellent adhesive forces as 55 kgf or more. Particularly, it can be seen that Examples of the present invention have very excellent high-temperature adhesive forces as Manufacturing Examples 1 to 6 are more excellent in high-temperature adhesive forces than Comparative Examples in such a way that Manufacturing Comparative Examples have high-temperature adhesive forces of 3.2 and 3.9 kgf although Manufacturing Examples 1 to 6 according to the present invention have high-temperature adhesive forces of 4.1 to 5.2 kgf.

Further, although it can be seen that all of Manufacturing Examples 1 to 6 and Manufacturing Comparative Examples have good high-temperature shrinking property levels of 260 cm³ or more, it can be seen that Manufacturing Examples 1 to 6 are more excellent in high-temperature shrinking properties than Manufacturing Comparative Examples 1 and 2.

Further, it can be seen that Manufacturing Examples 2 to 4 having low melt viscosity differences between a melt viscosity at 220° C. and a melt viscosity at 260° C. also have higher values even in spinning yield, and it can be seen that a polyester fiber for binder according to the present invention has excellent process properties, and thermal adhesive properties of the polyester fiber according to the present invention are improved through high process properties.

Particularly, Manufacturing Examples 2 to 4 in which 0.5 to 2.0 mol % of 2-methyl-1,3-pentanediol is contained in a diol component have a spinning yield of 99% or more, are excellent in both room-temperature adhesive force and high-temperature adhesive force, and are very excellent even in high-temperature shrinking properties. Therefore, it will be preferable that the 2-methyl-1,3-pentanediol is contained in the diol component in an amount of 0.5 to 2.0 mol %.

◆ Manufacturing Nonwoven Fabrics for Cabin Air Filter

Example 1

A fiber of 6-leaf cross-section with a roundness of 68% manufactured using polyethylene terephthalate with a melting point of about 265° C. was used in a first polyester fiber, and a low melting point polyester fiber of the aforementioned Manufacturing Example 3 was used in a second polyester fiber.

When manufacturing the second polyester fiber, 3 wt % of illite particles was contained in each of a sheath part and a core part with respect to weight of the second polyester fiber, and 15 wt % of an inorganic antibacterial agent, i.e., a silver-based zeolite was contained in the second polyester fiber with respect to weight of the illite particles.

The first polyester fiber is a monofilament having a fineness of 1.4 deniers and a fiber length of 6 mm, the second polyester fiber is a monofilament having a fineness of 2 deniers and a fiber length of 6 mm, and a nonwoven fabric for cabin air filter was manufactured by needle punching and thermally bonding the mixture after mixing 30 wt % of the first polyester fiber with 70 wt % of the second polyester fiber to obtain a mixture.

Example 2

A nonwoven fabric for cabin air filter was manufactured by the same method as in the aforementioned Example 1 except that 1 wt % of the illite particles was contained in the second polyester fiber.

Example 3

A nonwoven fabric for cabin air filter was manufactured by the same method as in the aforementioned Example 1 except that a modified cross-sectional yarn of cruciform 4-leaf cross-section with a roundness of 74% was used in the first polyester fiber.

Example 4

A nonwoven fabric for cabin air filter was manufactured by the same method as in Example 1 except that a fiber of circular cross-section with a roundness of 100% was used in the first polyester fiber.

Comparative Example 1

A nonwoven fabric for cabin air filter was manufactured by the same method as in Example 1 except that the illite particles and silver-based zeolite were not contained in the second polyester fiber.

Comparative Example 2

A nonwoven fabric for cabin air filter was manufactured by the same method as in the aforementioned Example 1 except that a fiber of circular cross-section with a roundness of 100% was used in the first polyester fiber, and the second polyester fiber was a sheath-core type fiber in which polyethylene terephthalate was used as the core part, and 66.5 mol % of terephthalic acid and 33.5 mol % of isophthalic acid as an acid component and 10.5 mol % of diethylene glycol and 89.5 mol % of ethylene glycol as a diol component were used in a low melting point polyester resin of the sheath part.

⊚ Evaluating physical properties of Examples 1 to 4 and Comparative Examples 1 and 2

After evaluating strength, antibacterial properties, and capturing properties of nonwoven fabrics for cabin air filter manufactured in Examples and Comparative Examples, evaluation results are shown in Table 3.

(1) Basis weight: Weight per 1 m² of paper was measured.
(2) Thickness: Thickness was measured in accordance with KS K 0506.
(3) Strength: Strength was measured by a bearing power in accordance with KS K 0520 when pulling the paper.
(4) Roundness: Area ratio of a circumscribed circle and an inscribed circle of yarn's cross-section Roundness (%) area of the inscribed circle ($B$)/area of the circumscribed circle ($A$)×100

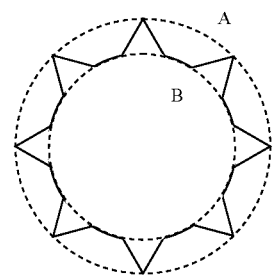

The lower the roundness is, the higher the cross-sectional degree of noncircular shape is.
(5) Antibacterial degree: Bacterial reduction rate was measured in accordance with KS K 0693.
(6) Capture efficiency: Capture efficiency (%) was measured in accordance with KS C 9314.

TABLE 3

| Classification | | Example 1 | Example 2 | Example 3 | Example 4 | Comparative Example 1 | Comparative Example 2 |
|---|---|---|---|---|---|---|---|
| Basis weight | | 50 | 50 | 50 | 50 | 50 | 50 |
| Content of micaceous mineral (wt %) | | 3 | 1 | 3 | 3 | 0 | 3 |
| Tensile strength (kgf) | MD | 7.45 | 7.42 | 7.05 | 7.11 | 7.54 | 6.25 |
| | CD | 3.38 | 3.25 | 3.09 | 3.11 | 3.86 | 2.03 |
| Bacterial reduction rate (%) | Strain 1 | 99.9 | 99.9 | 99.9 | 99.9 | 38.2 | 99.9 |
| | Strain 2 | 99.9 | 99.9 | 99.9 | 99.9 | 44.8 | 99.9 |
| Capture efficiency (%) | | 95 | 95 | 94 | 67 | 96 | 64 |

Strain 1: *Staphylococcus aureus* ATCC 6533 (*staphyloccus aureus*)
Strain 2: *Klebsiella pneumoniae* ATCC 4352 (pneumococcus)

As shown in Table 3, it can be seen that Examples 1 to 3 using a modified cross-sectional yarn as a first polyester fiber and containing micaceous mineral and silver-based inorganic antibacterial agent particles in a second polyester fiber have a bacterial reduction rate of 95% or more, i.e., high antibacterial properties, and have a capture efficiency of 90% or more, i.e., high dust capturing properties.

It can be seen that Comparative Example 1 which does not contain micaceous mineral and silver-based inorganic antibacterial agent particles in the second polyester fiber has very low antibacterial properties, and it can be seen that Example 4 and Comparative Example 2 using a fiber of circular cross-section only as the first polyester fiber have low capture efficiencies.

Further, as nonwoven fabrics for cabin air filter of Examples 1 to 4 and Comparative Example 1 using a low melting point polyester fiber formed from [Chemical formula 1] of the present invention are more excellent in strength than a nonwoven fabric for cabin air filter of Comparative Example using isophthalic acid, it can be seen that physical properties are improved when using a low melting point polyester fiber according to the present invention in the nonwoven fabrics for cabin air filter.

What is claimed is:

1. A nonwoven fabric for cabin air filter comprising
a first polyester fiber comprising a polyester resin having a melting point higher than 250° C., and
a second polyester fiber comprising a low melting point polyester resin having a softening point of 100 to 150° C.,
wherein the first polyester fiber is a modified cross-sectional yarn having multiple leaves capturing items, the first polyester fiber having a roundness of 50 to 80%, and
the second polyester fiber is a polyester composite fiber formed of a sheath part and a core part,
wherein the core part is formed from a polyester resin, and
the sheath part is formed from the low melting point polyester resin which is formed from an acid component selected from a group consisting of terephthalic acid or ester-forming derivatives thereof, and a diol component comprising a first component and a second component, wherein the first component is selected from the group consisting of 2-methyl-1,3-propanediol and ethylene glycol, and the second component is 2-methyl-1,3-pentanediol in a content of 0.5 to 2 mol % in the diol component,
the second polyester fiber comprises illite particles or a mixture of the illite particles and sericite particles, and a silver-based inorganic antibacterial agent particles and the low melting point polyester resin has a melt viscosity at 260° C. of 700 to 1,500 poise, and
the second polyester fiber comprises 0.3 to 3 wt % of the illite particles, or the mixture of the illite particles and sericite particles with respect to weight of the second polyester fiber, and the second polyester fiber comprise 5 to 30 wt % of the silver-based inorganic antibacterial agent particles with respect to weight of the illite particles or the mixture of the illite particles and sericite particles.

2. The nonwoven fabric for cabin air filter of claim 1, wherein the second polyester fiber is a modified cross-sectional yarn having the roundness of 50 to 80%.

3. The nonwoven fabric for cabin air filter of claim 1, wherein the low melting point polyester resin has 600 poises or less of a melt viscosity difference between a melt viscosity at 220° C. and a melt viscosity at 260° C.

* * * * *